US010191964B2

(12) United States Patent
Chandra

(10) Patent No.: US 10,191,964 B2
(45) Date of Patent: Jan. 29, 2019

(54) AUTOMATIC ISOLATION AND SELECTION OF SCREENSHOTS FROM AN ELECTRONIC CONTENT REPOSITORY

(71) Applicant: Microsoft Technology Licensing, LLC, Redmond, WA (US)

(72) Inventor: Omeed Chandra, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 141 days.

(21) Appl. No.: 13/905,814

(22) Filed: May 30, 2013

(65) Prior Publication Data
US 2014/0358919 A1 Dec. 4, 2014

(51) Int. Cl.
G06F 17/30 (2006.01)
H04N 1/21 (2006.01)

(52) U.S. Cl.
CPC ......... *G06F 17/30598* (2013.01); *H04N 1/21* (2013.01)

(58) Field of Classification Search
CPC .. G06F 17/5068; G06F 3/1454; G06F 3/0481; G06F 17/212; G06F 11/3664; G06F 17/30997; G06F 11/1438; G06F 17/30598; G06T 15/02
See application file for complete search history.

(56) References Cited

U.S. PATENT DOCUMENTS

| | | | |
|---|---|---|---|
| 7,961,202 B2 | 6/2011 | Conner et al. | |
| 2002/0032677 A1 | 3/2002 | Morgenthaler et al. | |
| 2013/0036364 A1* | 2/2013 | Johnson | G06F 21/6245 715/738 |
| 2013/0297696 A1* | 11/2013 | Alexandrov | H04L 65/403 709/204 |

(Continued)

FOREIGN PATENT DOCUMENTS

| | | |
|---|---|---|
| CN | 102201047 A | 9/2011 |
| CN | 103106387 A | 5/2013 |
| JP | 2013-25426 A | 2/2013 |

OTHER PUBLICATIONS

Hermann, Lukas, "Organize and Investigate Your Mobile Screenshots with Screenshot Journal," http://www.macstories.net/reviews/organize-and-investigate-your-mobile-screenshots-with-screenshot-journal, pp. 1-5 (Apr. 30, 2012).

(Continued)

Primary Examiner — Amresh Singh
Assistant Examiner — Courtney Harmon

(57) ABSTRACT

Automatic isolation of screenshots from other captured content items stored in an electronic content repository is provided. When a screen capture is performed on an electronic device, such as a smartphone, screen resolution information for the capturing device is stored with the captured content item (e.g., screenshot). When a user subsequently desires to recall a given stored captured screenshot, the resolution associated with each stored content item may be used for isolating screenshots from other stored content (Continued)

items like photographs, text items, clip art, and the like by comparing the resolutions of any of the stored content items with a screen resolution of the user's device or with known screen resolutions of various devices that may be used for capturing screen images.

20 Claims, 11 Drawing Sheets

(56) References Cited

U.S. PATENT DOCUMENTS

| | | | | |
|---|---|---|---|---|
| 2013/0339889 | A1* | 12/2013 | Bastide | G06F 9/4443 715/770 |
| 2014/0253574 | A1* | 9/2014 | Brown | G06T 1/0007 345/545 |
| 2014/0282660 | A1* | 9/2014 | Oztaskent | H04N 21/4828 725/18 |
| 2014/0344658 | A1* | 11/2014 | Srinivasan | G06F 17/2235 715/205 |

OTHER PUBLICATIONS

Lee et al., "Screenshot Identification Using Combing Artifact from Interlaced Video", Proceedings of the 12th ACM Workshop on Multimedia and Security, pp. 49-54 (Sep. 9-10, 2010).

International Search Report and Written Opinion Issued for PCT Application No. PCT/US2014/039636, dated Nov. 19, 2014, 10 Pages.

"Best Screen Snap for Nokia N70 version 1.01", Retrieved on: Mar. 5, 2013, Available at: http://nokia-n70-software.smartphoneware.com/screen_snap.php, 5 pgs.

K, Karthik, "How to use iPhoto Smart Albums to separate iOS Screenshots from normal Photos", Published on: Dec. 14, 2012, Available at: http://www.karthikk.net/2012/12/how-to-use-iphoto-smart-albums-to-separate-ios-screenshots-from-normal-photos/, 7 pgs.

Kahn, Jordan, "How to create a live-updating Photo Stream folder on your Mac, bypass iPhoto", Published on: Apr. 10, 2012, Available at: http://9to5mac.com/2012/04/10/how-to-create-a-live-updating-photo-stream-folder-on-your-mac-bypass-iphoto/, 3 pgs.

"Scrub iPhone Screenshots out of your Photo Collection", Retrieved on: Mar. 5, 2013, Available at: http://www.vector15.com/2012/11/08/scrub-iphone-screenshots-out-of-your-photo-collection/#/vanilla/discussion/embed/?vanilla_discussion_id=0, 3 pgs.

"Photo Stream", Published on: Jun. 9, 2011, Available at: http://www.apple.com/icloud/features/photo-stream.html, 5 pgs.

"International Preliminary Report on Patentability Issued in PCT Patent Application No. PCT/US2014/039636", dated Sep. 8, 2015, 8 Pages.

"First Office Action and Search Report issued in Chinese Patent Application No. 201480031313.1", dated Aug. 2, 2017, 13 Pages.

"Second Office Action Issued in Chinese Patent Application No. 201480031313.1", dated Jan. 19, 2018, 11 Pages.

"Third Office Action Issued in Chinese Patent Application No. 201480031313.1", dated Jul. 12, 2018, 8 Pages.

\* cited by examiner

AUTOMATIC ISOLATION AND SELECTION OF SCREENSHOTS FROM AN ELECTRONIC CONTENT REPOSITORY

BACKGROUND

With the advent of modern electronic computing devices, a vast amount of information is created and captured through content creation applications, such as word processing applications, spreadsheet applications, slide presentation applications, notes taking applications, and the like. In addition, large amounts of content items are captured as photographs, screenshots, video files, audio files, etc. In many situations, a user desires to insert or paste captured content into an application document for a variety of purposes. For example, a user of a notes taking application may desire to capture a page from an Internet-based newspaper for insertion into his/her notes for later use.

Unfortunately, many electronic devices, such as smartphones, tablet computing devices, personal computers, and laptop computers store captured content, such as photographs and captured screenshots, into a single content repository. When a user desires to retrieve a given content item, for example, a screenshot, he/she must navigate through all stored content items to find the desired screenshot or other captured content item. Such a navigation process can be time-consuming and cumbersome, requiring the user to view tens or even hundreds of images to find the desired screenshot or other captured content item.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing for automatic isolation of and selection of screenshots and other captured content items stored in an electronic content repository. According to embodiments, when a screen capture is performed on an electronic device, such as a smartphone, tablet computer, laptop computer, desktop computer, or the like, the resolution of a captured content item (e.g., screenshots) will match the screen resolution of the capturing device. When a user subsequently desires to recall a given stored captured screenshot, the resolution associated with each stored content item may be used for isolating screenshots from other stored content items like photographs, text items, clip art, and the like by comparing the resolutions associated with stored content items with the screen resolution of the user's capturing device. According to an alternate embodiment, if the user desires to recall a given screenshot from a storage of captured content items that may have been captured by other devices having different device screen resolutions, then each stored content item may be analyzed as possible screenshots by comparing stored content items against known screen resolutions of various devices that may be used for capturing screen images.

Once screenshots are isolated from other content items, they may be displayed to a user. The user may review and use the isolated screenshots for a variety of purposes, and/or the user may select one or more of the isolated screenshots for insertion into an application document. For example, selected screenshots may be inserted into one or more application documents, for example, notes application documents, word processing documents, and the like, for subsequent use as desired.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various embodiments of the present invention.

DETAILED DESCRIPTION

Figure 1:
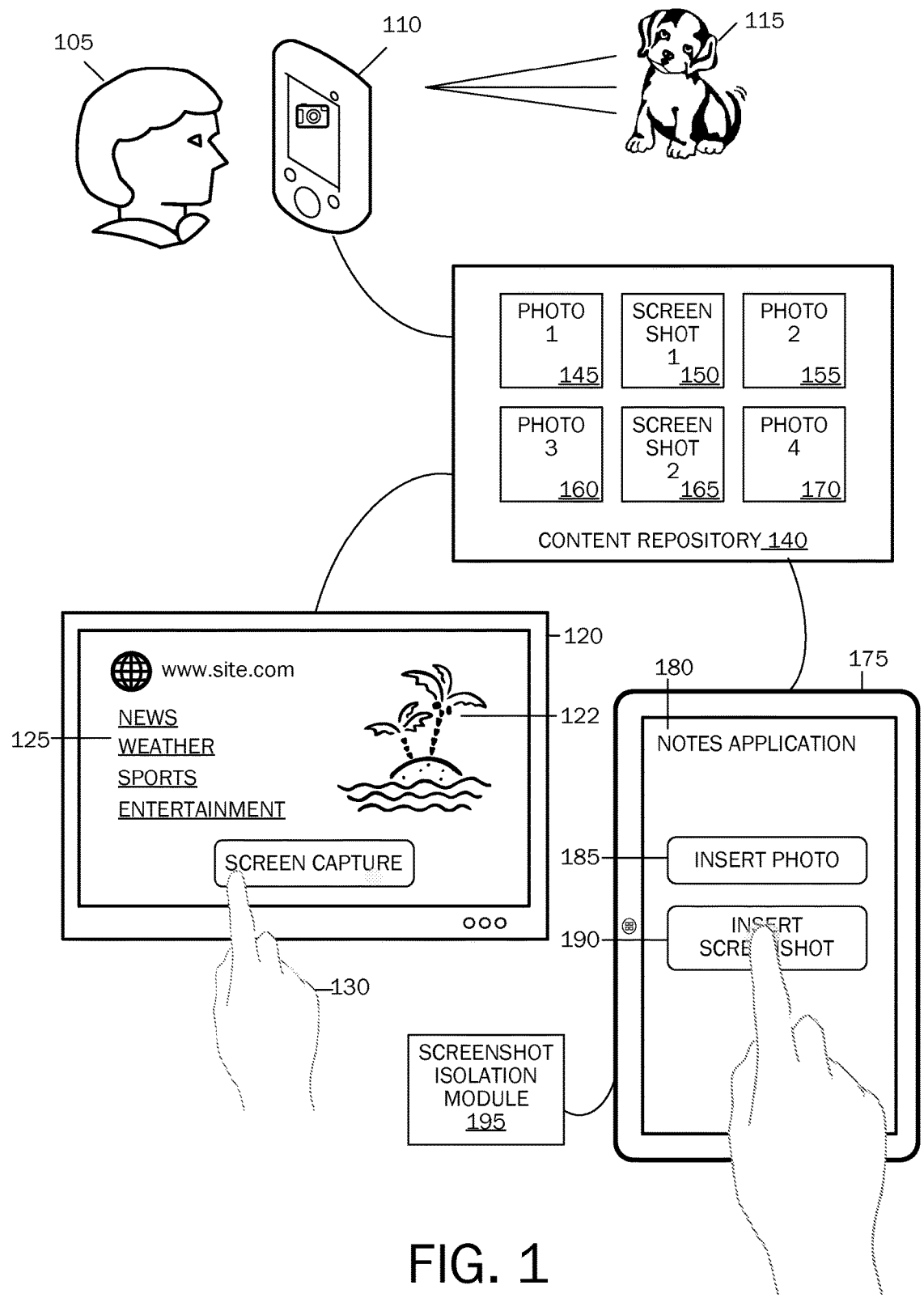
FIG. 1 is a block diagram of one embodiment of a system for isolating and selecting captured screen images or screenshots from a repository of stored content items.

As briefly described above, embodiments of the present invention are directed to isolation and selection of captured screen images or screenshots from a content repository containing a variety of stored content items.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described may be modified by substituting, reordering, or adding stages to the disclosed methods. Accordingly, the following detailed description does not limit the invention but, instead, the proper scope of the invention is defined by the appended claims.

FIG. 1 is a block diagram of one embodiment of a system for isolating and selecting captured screen images or screenshots from a repository of stored content items. As illustrated in FIG. 1, content items may be captured using one or more electronic devices and may be stored to a local or remote content repository of storage area for subsequent use and enjoyment. For example, a user 105 operating a handheld computing device 110, for example, a smartphone, a tablet computing device, a camera, a laptop computer, or any other computing device operative for capturing photographic images, captures an image of an object 115 for subsequent use and enjoyment. For example the user 105 may be photographing a pet 115 using a handheld smartphone 110 for storing photographs of the pet in a content or photograph library. As should be appreciated, the illustrated computing devices 110 (and 120, 175 described below) are illustrative of a single or one or more different computing devices. That is, content may be captured, stored and used with a single device 110, 120, 175, or content captured using one device may be utilized on another device according to embodiments of the invention.

Referring still to FIG. 1, a computing device 120, for example, a smartphone, tablet computing device, laptop computer, desktop computer or other computing device operative for displaying a variety of content 122, is illustrated showing an Internet-based web page displayed on a display surface 125 of the computing device 120. According to an embodiment, a user 130 may capture, as a screenshot, information, images, or other content displayed on the display screen 125 of the computing device 120. The captured screenshot may be stored to a local or remote storage repository for subsequent use and enjoyment by the user. For example, a user may be reviewing an Internet-based news article on the display surface 125 of her computing device 120, and the user may utilize a screen capture function of the computing device 120 for capturing and storing the news article for some subsequent use, for example, for inserting the news article into a notes application document, word processing application document, slide presentation application, or the like. Alternately, the user may be interested in capturing the article as a screenshot for subsequent review, particularly, where the user is concerned that the Internet-based page on which the article is displayed may be changed, and the article may not be available for subsequent user or enjoyment.

A typical screen capture function of a typical computing device 110, 120 allows for the automatic capture and storage of any content displayed on the display surface 125 of the computing device 120. That is, text content, photographs, images, articles, links, or any other content displayed on the display surface of the computing device may be captured as a screenshot and may be stored for subsequent use.

As well understood by those skilled in the art, computing devices 110, 120 on which may be displayed various content items on a display screen or surface 125 operate according to one or more screen resolutions associated with the display of content on the display screen or surface 125. For example, a handheld tablet computing device may have a screen resolution of 1,024 by 768 pixels, or 2,048 by 1,536 pixels, or a multitude of other screen resolutions depending on the size of the display surface provided by the device. As should be appreciated, these are only a couple of example screen resolutions and are not exhaustive of a vast numbers of different screen resolutions that may be utilized for a given device with which information displayed on a display surface of the device may be captured as a screenshot.

Referring still to FIG. 1, content captured by electronic devices 110, 120, whether photographic content, screen captures, or the like, may be stored in a single content repository 140 that is maintained either locally on the computing devices 110, 120 or remotely at a storage location that is accessible by the computing devices 110, 120 via a distributed computing network, for example, the Internet. That is, photographic images or captured screenshots may be stored locally on the capturing devices in a content repository 140, or those content items may be passed to a remote content storage repository stored on one or more servers or other storage devices accessible to the computing devices 110, 120 via a wired or wireless data connection. As illustrated in FIG. 1, the local or remote content repository 140 may include a variety of different content items, for example, a photograph 145, a screenshot 150, a second photograph 155, a third photograph 160, a second screenshot 165, a fourth photograph 170, and the like.

Referring still to FIG. 1, a computing device 175 is illustrated on which is launched an exemplary software application 180 with which a user may create, edit, review, or otherwise utilize and enjoy content of various types. As illustrated in FIG. 1, a notes taking application 180 is illustrated with which a user may generate, edit, and utilize notes for use according to a variety of purposes or needs. An insert photo button 185 is illustrated for allowing a user to insert a photograph from the local or remote content repository 140 into a document enabled by the example notes application 180. An insert screenshot button 190 is illustrated for allowing a user to insert a captured screenshot from the local or remote content repository 140 into a document enabled by the example notes application 180.

As should be appreciated, the example notes application 180, and the user interface components 185, 190 are for purposes of example only and are not exhaustive of the vast numbers of software applications, such as word processing applications, slide presentation applications, spreadsheet applications, desktop publishing applications, and the like with which content such as photographs or captured screenshots may be obtained for insertion into one or more documents as desired by an editing user. In addition, captured screenshots may be used for a variety of other purposes other than insertion into one or more documents. For example, a captured screenshot could be isolated from other captured content, as described herein, and could be sent to various recipients for desired uses. For example, a screenshot of a malfunctioning software application user interface could be sent to a technical support application for assistance from customer support personnel.

Referring still to FIG. 1, the screenshot isolation module 195 is illustrative of an application module containing sufficient computer-executable instructions for isolating captured screenshots from other stored content items, as described herein. As described below, according to embodiments, the module 195 may compare resolutions associated with various content items against known device screen resolutions for isolating given content items as screenshots captured by devices having the same or similar screen resolutions. The module 195 may operate as part of a given application, for example, a notes taking application, a word processing application, a slide presentation application, a spreadsheet application, a desktop publishing application, and the like. Alternatively the module 195 may operate as an independent application that may be called by other such applications for providing screenshot isolation, as described herein.

Figure 2:
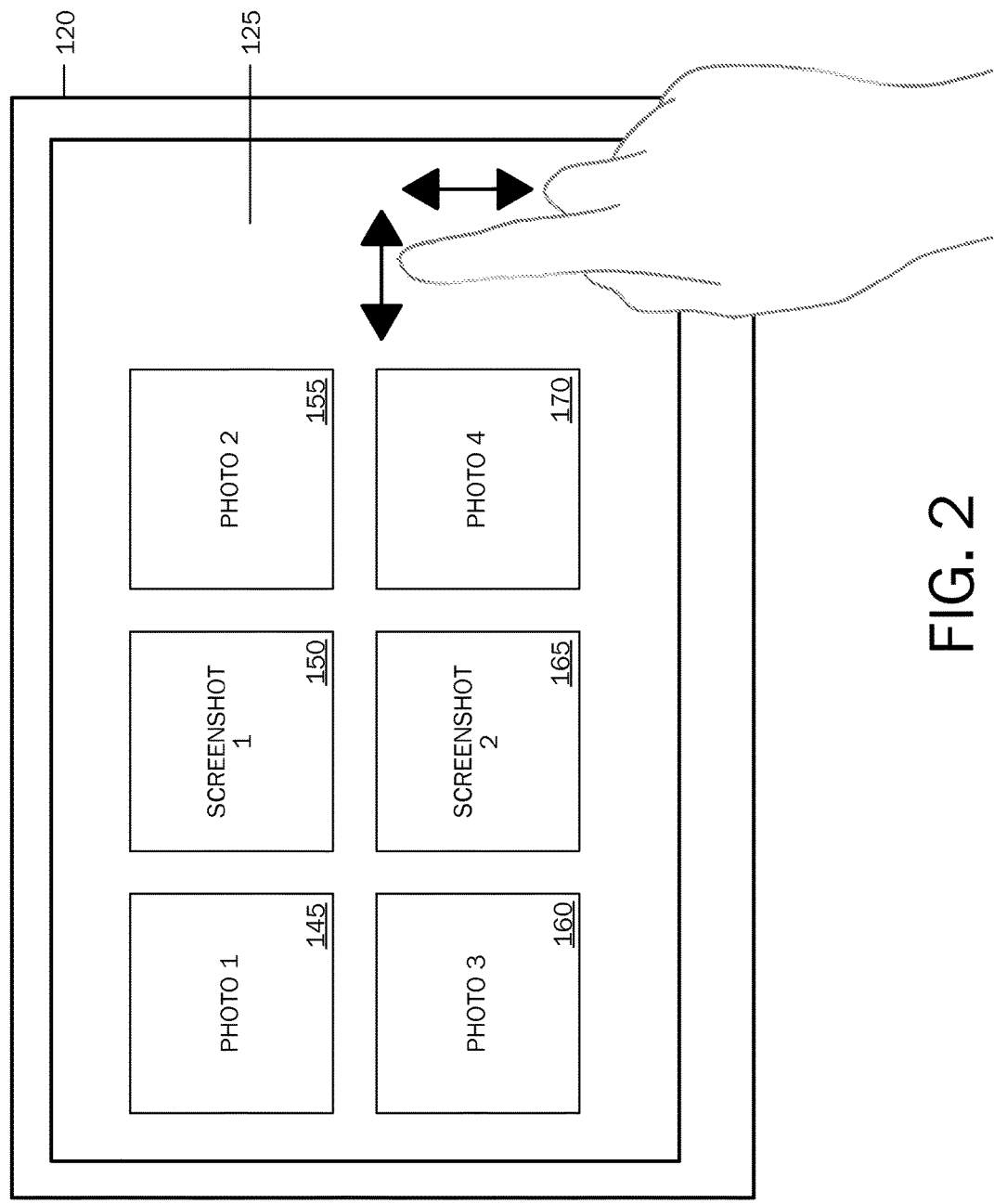
FIG. 2 illustrates a visual listing of a variety of content items stored in a single content repository.

FIG. 2 illustrates a visual listing of a variety of content items stored in a single content repository. As described above with reference to FIG. 1, content captured by one or more of many types of computing devices 110, 120, 175 may be stored in a local or remote content repository 140 regardless of the content type or regardless of the means by which the content was captured. For example, with respect to many handheld computing devices, for example, smartphones, tablet computers, laptop computers, and the like, both photographic content and screen capture content are stored in a single content repository, often referred to as a camera roll, photographic library, or similar designation in which content of many types are stored.

Referring to FIG. 2, a tablet style computing device 120 is illustrated, and the contents of the local or remote content repository (e.g., camera roll, photographic library, content library, etc.) are displayed on the display surface 125 of the device 120. As should be appreciated, the user 130 may have selected through any suitable input means, for example, touch, gesture, swipe, flick, mouse click, stylus, etc., a hard or soft functionality key for displaying the contents of the local or remote content repository 140. In response, a variety of content types, for example, a first photograph 145, a first screenshot 150, a second photograph 155, a third photograph 160, a second screenshot 165, and a fourth photograph 170 may be displayed on the display surface 125 of the device 120. As should be appreciated, the captured objects illustrated in FIG. 2 are for purposes of example only and are not exhaustive of the vast numbers of different content objects that may be stored and may be displayed as illustrated in FIG. 2. For example, a given user 130 may have hundreds or even thousands of photographs, screenshots, or other content items stored in the local or remote content repository 140 that may be displayed on the display surface 125 or the device 120 as illustrated in FIG. 2.

Once the content items stored in the content repository 140 are displayed on the display surface 125 of the device 120, as illustrated in FIG. 2, the user 130 may navigate (via any suitable means) through each of the content items to find one or more content items the user 130 desires for some type of use or enjoyment. For example, the user 130 may navigate through the displayed content items by swiping his/her finger, a stylus, or the like on the display surface 125 to move the images to the right, to the left, up, or down, as desired, to allow the user to see other content items, or the user may navigate through the displayed images using one or more keyboard entries, mousing entries, gestures, and the like. If the computing device is operative for receiving voice commands, the user 130 likewise may navigate through the displayed content items through voice commands, for example, "move right," "move left," "move up," "move down," and the like.

As briefly described above, one problem associated with the display of numerous content types captured according to different means, for example, photographic capture versus screen capture, is that when the user subsequently desires to isolate a given content item, for example, a screenshot, from other content items contained in the content repository, the user 130 must navigate through all stored and displayed content items in order to find the desired content item. For example, if the user 130 captured an article from an Internet-based web page for subsequent use in a notes taking application 180 document, the user 130 may have to display all stored content items, as illustrated in FIG. 2, followed by navigating through each of the displayed items until the desired screenshot is found.

Figure 3:
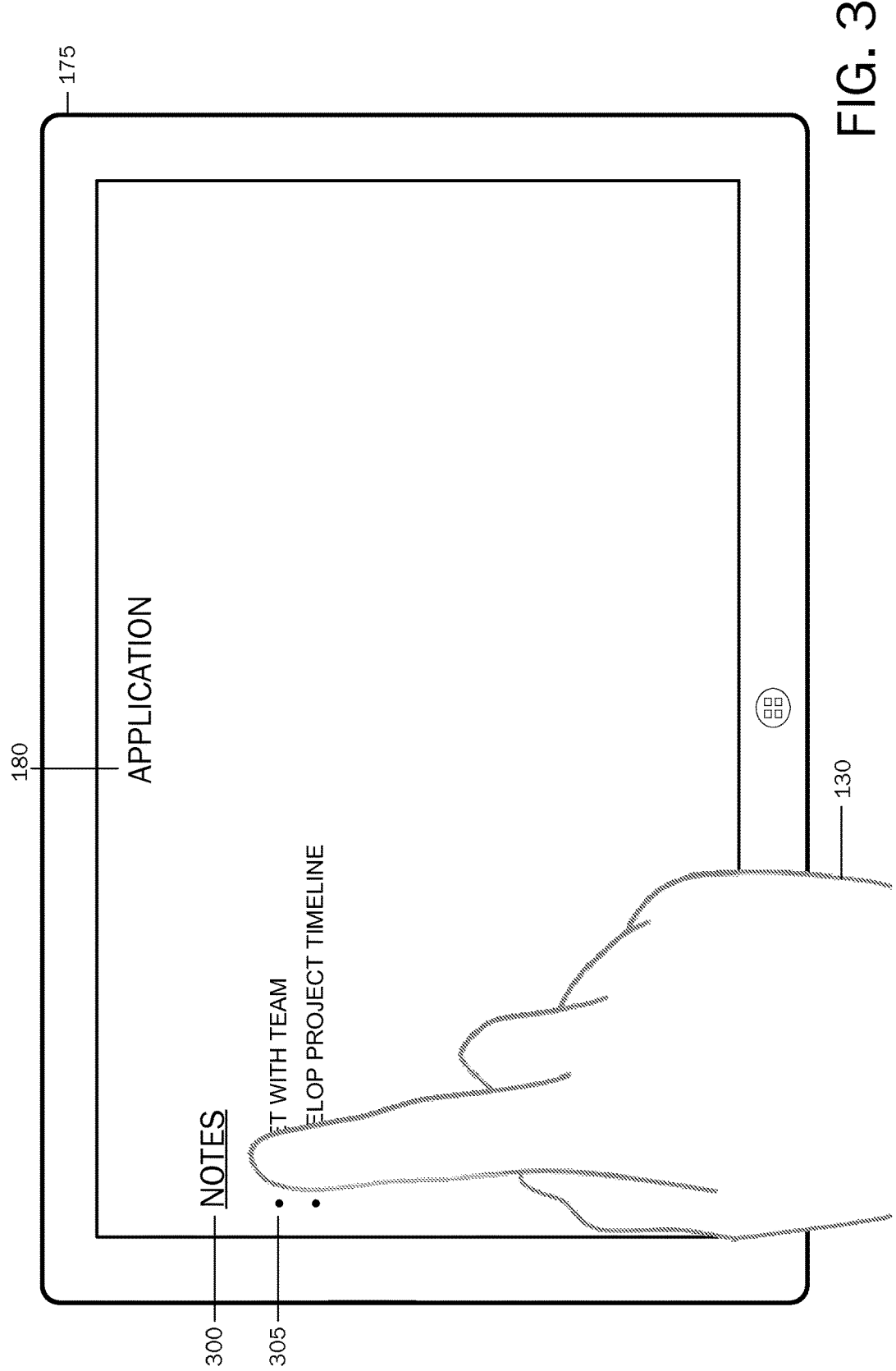
FIG. 3 illustrates an example software application user interface and an electronic document into which a user may desire to insert a content item, for example, a captured screenshot.

FIG. 3 illustrates an example software application user interface and electronic document into which a user may desire to insert or paste a content item, for example, a captured screenshot. As illustrated in FIG. 3, a software application is launched and an associated application user interface for the software application is displayed on the display surface 180 of the computing device 175. For example, as illustrated in FIG. 3, a notes taking application 300 has been launched, and one or more notes items 305 have been entered by a user 130 in association with some task, project, or other activity for which the user 130 desires to enter and maintain notes. As should be appreciated, the application illustrated in FIG. 3 is for purposes of example only and is not limiting of the exhaustive list of software applications that may be utilized in accordance with embodiments of the present invention, for example, word processing applications, slide presentation applications, spreadsheet applications, and the like.

Figure 4:
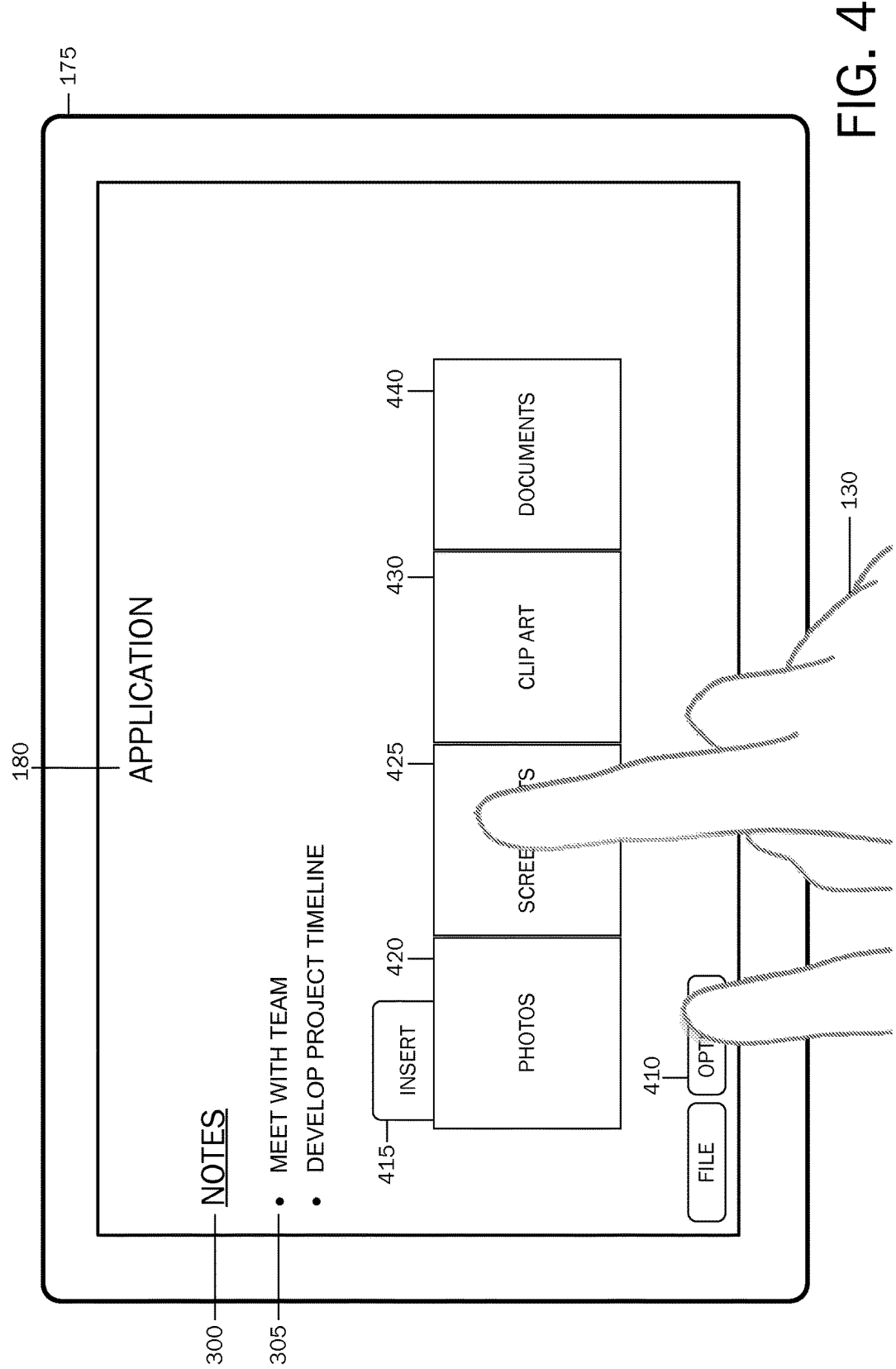
FIG. 4 illustrates an example software application user interface and an electronic document into which a user may desire to insert a content item and illustrates an example function menu for selecting a desired content item for inserting into an electronic document.

Referring to FIG. 4, if the user 130 desires to isolate (for any suitable use) a given stored content item, for example, a photograph, screenshot, document, clip art item, and the like, the user may select an option 410 associated with the application 300 for accessing stored content items. For example, if the user 130 desires to locate a given captured screenshot for inserting into a document, the user 130 may select an appropriate option 410 for launching a user interface component 415 for allowing the user to select one or more insert or pasting functions available to the application 300. As illustrated in FIG. 4, an example insert menu 415 is illustrated and provides functions for inserting photographs 420, screenshots 425, clip art 430, documents 440, and the like. As should be appreciated, the example options function 410 and example insert menu 415 are for purposes of example only and are not limiting of the variety of user interface components/elements that may be provided by a given application 300 for allowing a user 130 to apply various functions to one or more content items, including inserting stored content items into a document enabled by the application 300.

Figure 7:
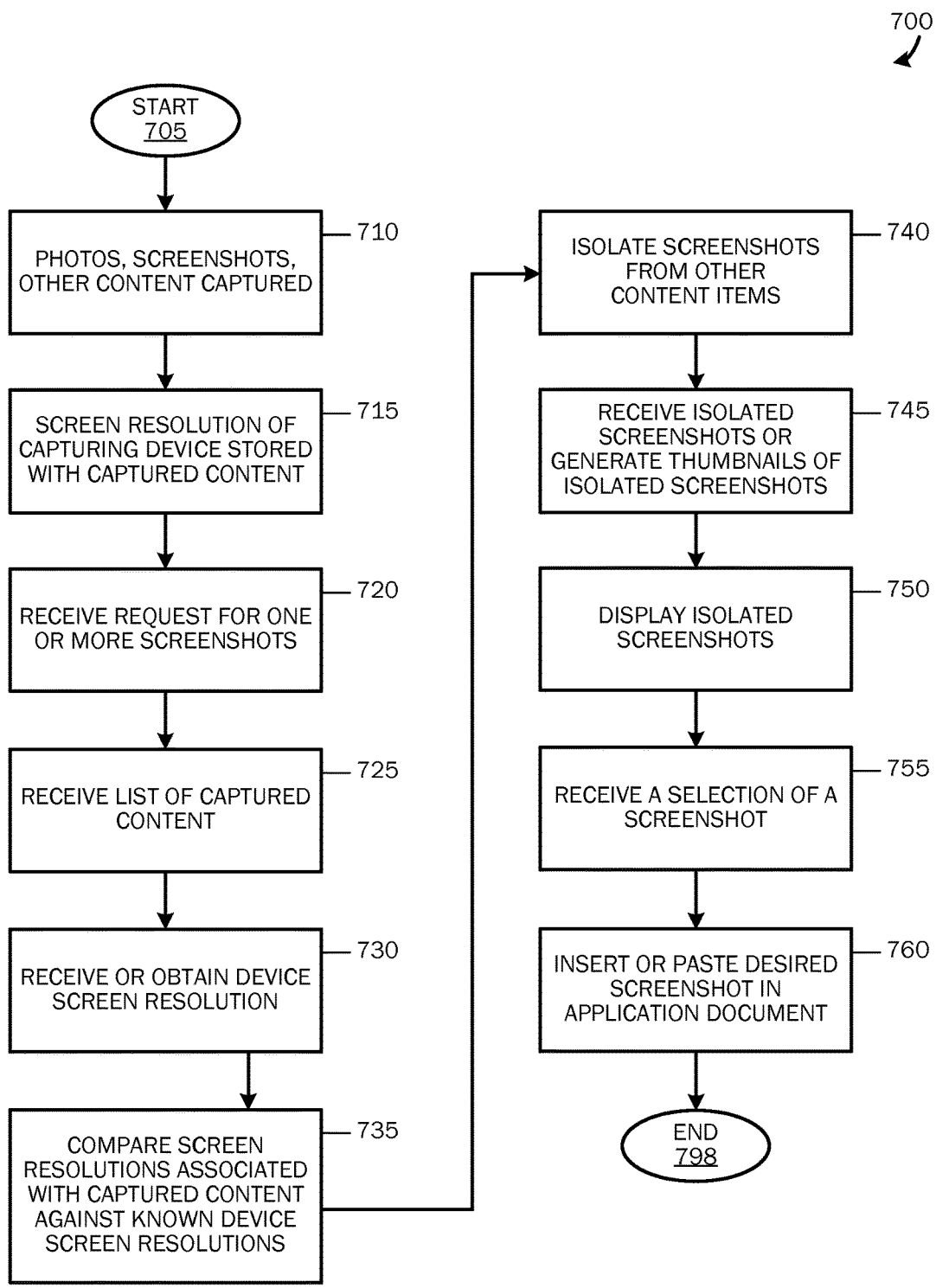
FIG. 7 is a flow chart of a method for isolating and selecting captured screenshots from an electronic content repository.

As described in further detail below with reference to FIG. 7, according to embodiments of the present invention, when a user selects a function for allowing the user to locate a screenshot for any suitable use, for example for inserting a screenshot into a document being enabled by a given application 300, each stored content item maintained in the local or remote content repository 140 may be passed to the application 300 for displaying in a menu or gallery of content items for allowing the user to select a desired content item for a given use, including for insertion into a desired document, for example, a notes taking application document. According to embodiments of the present invention, the content items passed to the application 300 may be passed to the application from the device 110, 120, 175 with which the content items were captured and at which the content items are stored, or the content items may be passed to the requesting application 300 from a remote content repository to the requesting application at the computing device on which the requesting application is operating. According to one embodiment, the content items may be passed from a local device 110, 120, 175, or from the remote content storage repository, according to an application programming interface (API) operative for responding to a request for stored content items received from the application 300 in use by the user.

According to embodiments, when the stored content items, including photographic images, screenshots, and other stored content items, are passed to the requesting application 300, resolutions associated with any of the content items may be used for analysis of the stored content items as possible screenshots. As described herein, any resolutions for any of the stored content items may be compared against the screen resolution of the user's capturing device, 110, 120, 175, and if resolutions for any of the stored content items match the screen resolution of the user's capturing device, then such matching items may be isolated as screenshots.

If the requesting application 300 receives content items from a content repository 140 containing items captured by one or more different devices, then the screen resolutions of the capturing device may be passed to the requesting application 300 for comparison with the resolution (if any) of the received content items. That is, for any screenshots captured and stored in the local or remote content repository 140, screen resolutions of the devices 110, 120, 175 with which those screenshots were captured are passed to the requesting application 300 along with the captured screenshots for analysis. For example, if one screenshot was captured using a small smartphone 110, then the screen resolution associated with the smartphone 110 will be passed to the requesting application 300 with the stored screenshot. If another screenshot was captured on a larger form tablet-style computing device 110, then the screen resolution associated with the larger form tablet-style computing device 120 likewise will be passed to the requesting application 300 with screenshots captured using that device, and so on.

Figure 5:
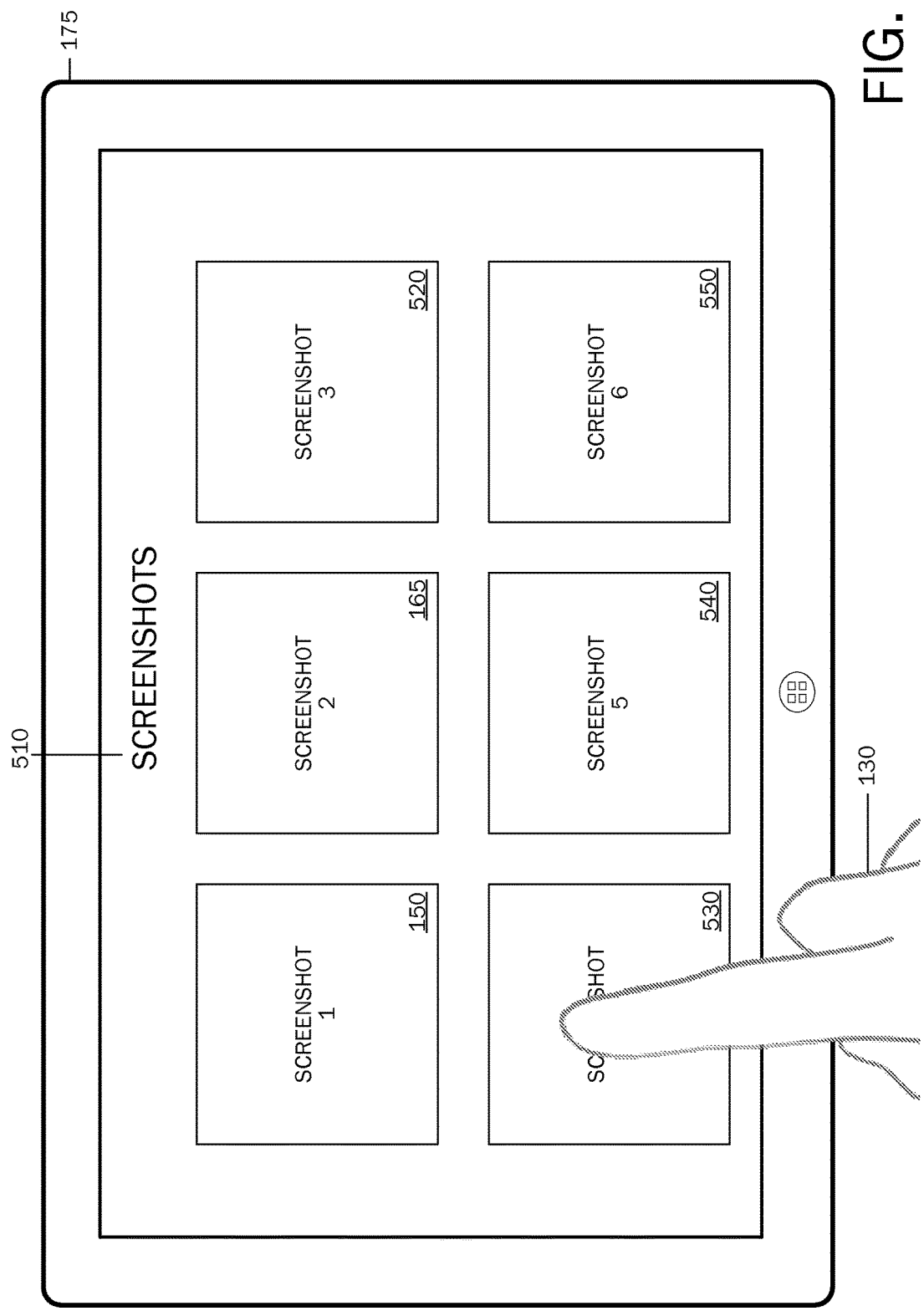
FIG. 5 illustrates a visual listing of one or more captured screen screenshots isolated from other stored content items.

Referring now to FIG. 5, and as will be described further below with respect to FIG. 7, upon receiving a command by the user for obtaining one or more screenshots from the content repository 140 for any use, including for inserting a screenshot into a document being enabled by the application 300, the screenshot isolation and selection module 195, described above with reference to FIG. 1, compares resolutions associated with one or more of the content items received from the local or remote content repository 140 against the screen resolution of the user's content capturing device 110, 120, 175. If stored content items were received from a variety of different devices, then the resolutions associated with one or more content items may be compared against known screen resolutions for various computing devices 110, 120, 175.

Figure 6:
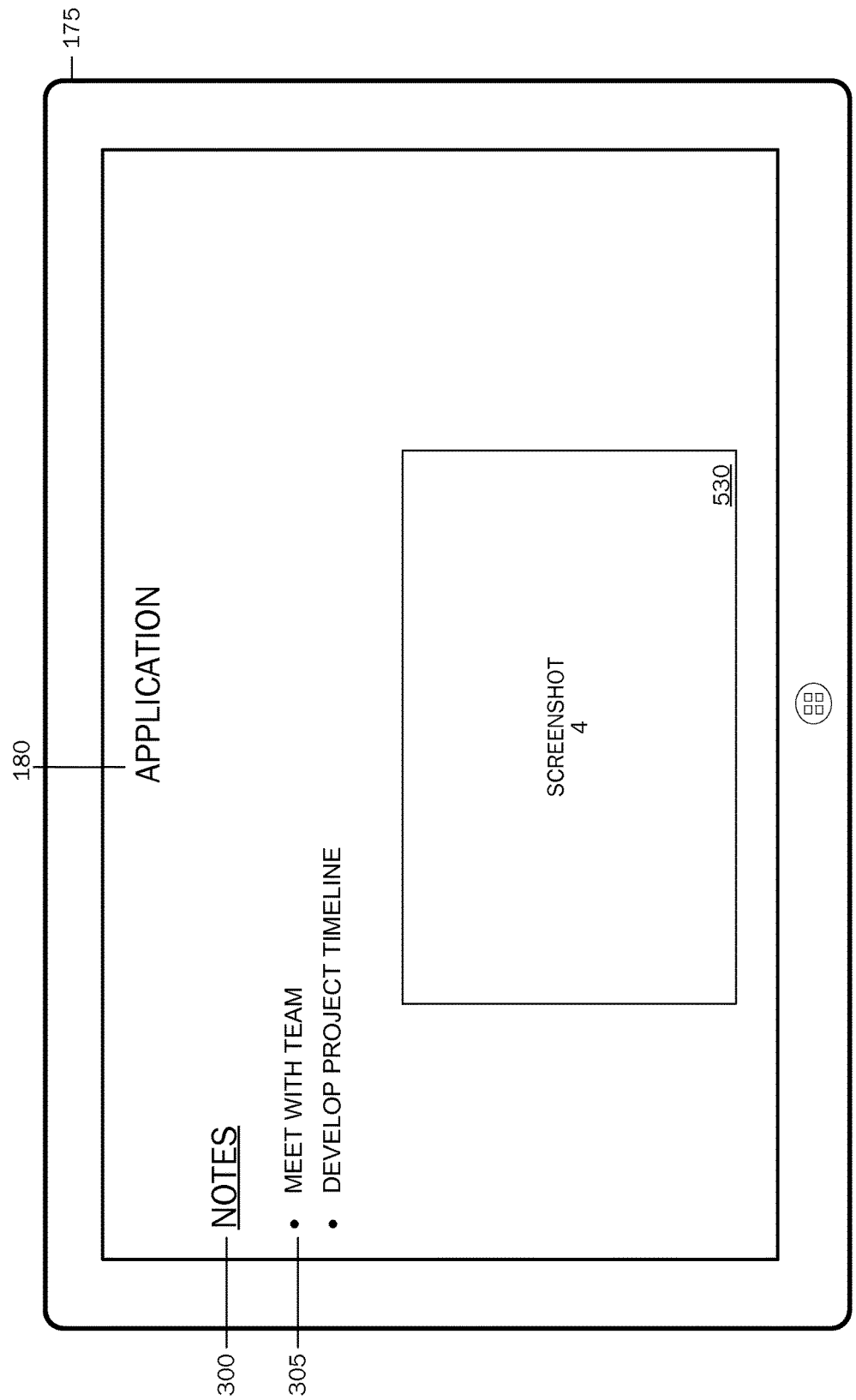
FIG. 6 illustrates the application user interface and associated electronic document of FIG. 3 showing a selected captured screenshot inserted into the illustrated electronic document.

In either case, screenshots are isolated from other content items, for example, photographs, text items, clip art items, and the like so that a menu or gallery of available screenshots 510 may be displayed on the display surface of the user's computing device 175, as illustrated in FIG. 5. That is, instead of displaying all received content items from the local or remote content repository 140, only those items isolated as screenshots may be displayed to allow the user's selection process to be much more efficient. Referring to FIG. 6, upon selection of a given screenshot, for example, the screenshot 4 (530) illustrated in FIG. 5, the user may use the selected screenshot for a variety of purposes, including inserting the screenshot into a document, for example, a notes document, as illustrated in FIG. 6, or for sending the screenshot to a desired recipient.

As should be appreciated, isolation of screenshot items from other content items is not limited to isolation for subsequent selection, insertion, or pasting into a document, as described above. Moreover, isolation of screenshots from other content items is not limited to isolation of all screenshots from all other content items. That is, isolation of screenshots from other content items may be performed according to embodiments of the present invention to simply allow a user to isolate screenshots for subsequent navigation, review, and enjoyment apart from the need for inserting or pasting one or more screenshots into a document. For example, a user may wish to find a screenshot of an article he/she captured from a website to simply read and enjoy the captured article as opposed to isolating the screenshot from other content items for purposes of inserting or pasting the screenshot into another document.

In addition, because resolutions associated with various screenshots are different depending upon the screen resolutions of the devices with which those screenshots were captured, embodiments of the present invention may be utilized for not only isolating screenshots from other content items, but for categorizing isolated screenshots according to device types. For example, in addition to isolating screenshots from other content items for display in a gallery or menu of screenshots, as illustrated in FIG. 5, embodiments of the present invention may be used for filtering screenshots according to device type. For example, all screenshots captured from a smartphone device 110 having a particular screen resolution may be isolated and grouped together, all screenshots captured using a tablet-style computing device having a different screen resolution may be isolated and grouped together, and so on. Thus, if a given user knows that he/she has captured certain content items using his/her smartphone device 110, screenshots captured using the smartphone device 110 may be isolated from other content items and may be further isolated from screenshots captured using devices having other screen resolutions.

In addition, embodiments of the invention may also be used for isolating photographs or other content items from screenshots. That is, according to an alternative embodiment, if a user desires to navigate only non-screenshot content items, by isolating screenshots from other content items, the other content items may be provided in a gallery or menu of content items without showing captured screenshots. For example, a given user may capture a great number of screenshots, and the user may desire to review only photographs. Just as the resolutions associated with screenshots may be used for surfacing or exposing screenshots apart from other content items, likewise screenshots may be isolated so that other content items may be surfaced and exposed apart from screenshots.

Having described various aspects of embodiments of the present invention above with reference to FIGS. 1 through 6, FIG. 7 is a flow chart of a method for isolating and selecting captured screen images or screenshots from an electronic content repository. The method 700 begins at start operation 705 and proceeds to operation 710 where photographs, screenshots, and/or other content items are captured utilizing one of a variety of computing devices 110, 120, 175, described above. At operation 715, the screen resolution associated with each capturing device is obtained from the capturing device and is associated with each captured screenshot. Each captured content item, for example, screenshots, are stored in a local content repository 140 at the capturing device, or remotely at a remote content repository 140 accessible by one or more devices 110, 120, 175.

At operation 720, a request is received for one or more screenshots. As described above, the request to obtain one or more screenshots may be received by an application 300, for example, a notes taking application, a word processing application, a slide presentation application, a spreadsheet application, or the like for obtaining a given screenshot for inserting into a document enabled by the requesting application. Alternately, as described above, the request for one or more screenshots may be for displaying one or more screenshots in a menu or gallery of screenshots for review by a requesting user apart from the need for inserting or pasting a requested screenshot into a document of some type.

At operation 725, the requesting application, either an application with which a requested screenshot will be inserted or pasted or an application for displaying a menu or gallery of requested screenshots, receives a list of captured content items stored at the content repository 140. As described above, for each captured content item, if a resolution is associated with the captured content item, then the screen resolution may be used for analysis of the content item as a possible screenshot.

At operation 730, the screenshot isolation module 195 receives or obtains the screen resolution of the user's content capturing device 110, 120, 175, or if the content items are associated with a number of different devices 110, 120, 175, then the module 195 may receive or obtain a list of known device screen resolutions with which one or more screenshots may have been captured. According to embodiments, the screen resolution of the user's device may be obtained from the device by the module 195, or in the case of a list of known device screen resolutions, the list may be maintained by the screenshot isolation module 195 locally at the device on which the module operates, or the module 195 may obtain a list of screen resolutions from a remote repository of screen resolutions accessible by the module 195. As should be appreciated, as new devices enter operation having different screen resolutions, the module 195 may be updated with additional screen resolution information, or a remote repository of screen resolution information may be updated that may be accessed by the module 195 for use in accordance with the embodiments of the present invention.

All the functions described herein may be applied to a single device where isolation of screenshots from other content items, such as photographs, is performed by comparing a resolution of stored content items with the screen resolution of the device in use. That is, a user may use his/her device (e.g., smart phone) for taking photographs and for capturing display screens, and all such content may be stored in a single content repository 140 associated with the device. Thus, in determining whether a given content item is a screenshot, a comparison of a resolution associated with the given content item is compared with the screen resolution of the device for quickly and efficiently isolating screenshots from other types of content items.

At operation 735, the resolutions associated with the received captured content items are compared against the user's content capturing device 110, 120, 175 or against known device screen resolutions (in the case of content from multiple devices) for determining which of the received content items are captured screenshots. Any content items not associated with a screen resolution may be discarded from further analysis for possible inclusion in a menu or gallery of screenshots. For remaining content items for which associated resolution information is included, a comparison may be made of the included resolution information against the screen resolution of the user's device or against known device screen resolutions for matches. Any content items having resolution information matching the screen resolution of the user's device or other known device screen resolutions may be isolated and set aside for inclusion in a menu or gallery of screenshots 510 as illustrated and described above with reference to FIG. 5. Any received content items having resolutions that do not match the screen resolution of the user's device or other known device screen resolutions may be discarded from further analysis and may not be included in the menu or gallery of screenshots, as illustrated in FIG. 5.

Alternately, for any received content items having resolutions that do not match the screen resolution or the user's device or the resolutions of other known devices, such content items may be presented to a requesting user via a user interface component to allow the requesting user to decide whether the requested item is a captured screenshot or not. Alternately, all received content items being associated with a screen resolution may be presented in the menu or gallery of screenshots even if they do not match the screen resolution of the user's device or other known device screen resolutions in order to isolate those items that may be associated with new devices for which known screen resolutions are not obtained by the module 195 or that may have been captured by an old device for which screen resolution information is no longer available to the module 195.

At operation 740, based on the comparison of received resolution information for received content items against the screen resolution of the user's device or other known device screen resolutions, screenshots are isolated from other content items, and at operation 745, the isolated screenshots may be displayed in a menu or gallery of screenshots 510, as illustrated in FIG. 5, or thumbnail images of the associated screenshots may be generated for display in the menu or gallery of screenshots 510. At operation 750, the isolated screenshots or thumbnail images of the isolated screenshots may be displayed to the user, as illustrated in FIG. 5. If the user desires to navigate through the displayed screenshots or thumbnail images of the received screenshots without selecting one or more of the screenshots for inserting into a document, the method may end at operation 798. Alternately, at operation 755, if a selection of a given displayed screenshot or thumbnail image of a received screenshot is received, the method proceeds to operation 760, and the selected screenshot may be inserted into an application document, for example, the notes taking application document illustrated in FIG. 6.

According to an alternate embodiment, a gallery of electronic content items containing different types of content, such as photographs, screenshots, text items, clip art, and the like, as illustrated in FIG. 2, may be provided, and an application function either as part of the functionality associated with the device 110, 120, 175 or as part of a separate application 300 may provide for filtering the displayed content items according to different filtering properties. According to one filtering property, all screenshots may be isolated and displayed in a gallery of screenshots, as described herein, and as illustrated in FIG. 5. According to another filtering property, after isolation of screenshots, all non-screenshot items may be displayed in a gallery of non-screenshot items (e.g., all photographs). According to another filtering property, a gallery of screenshots may be displayed segregated by screen resolution such that screenshots are displayed according to the device type (e.g., smartphone versus tablet).

The method 700 ends at operation 798.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
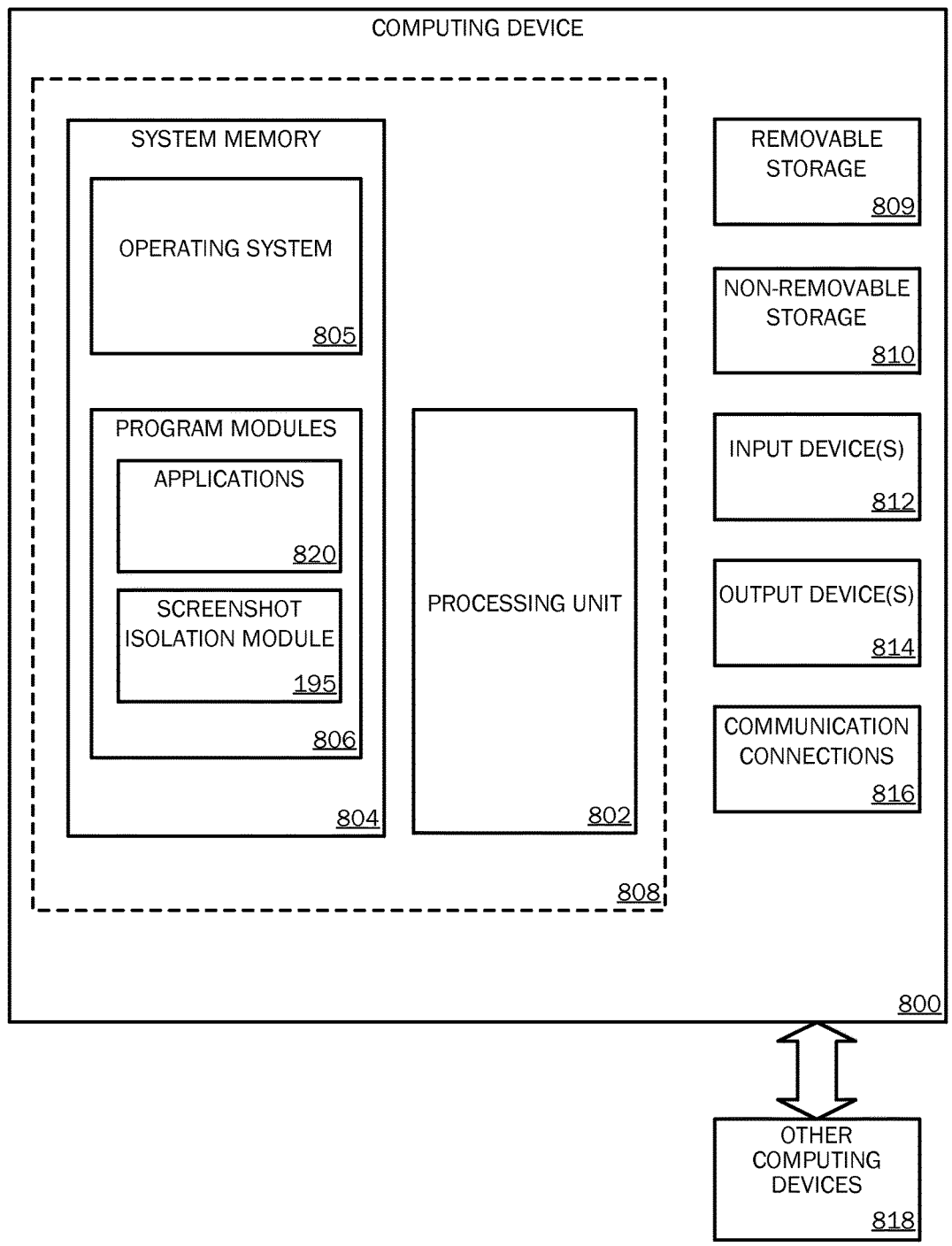
FIG. 8 is a block diagram illustrating example physical components of a computing device with which embodiments of the invention may be practiced.
Figure 9A:
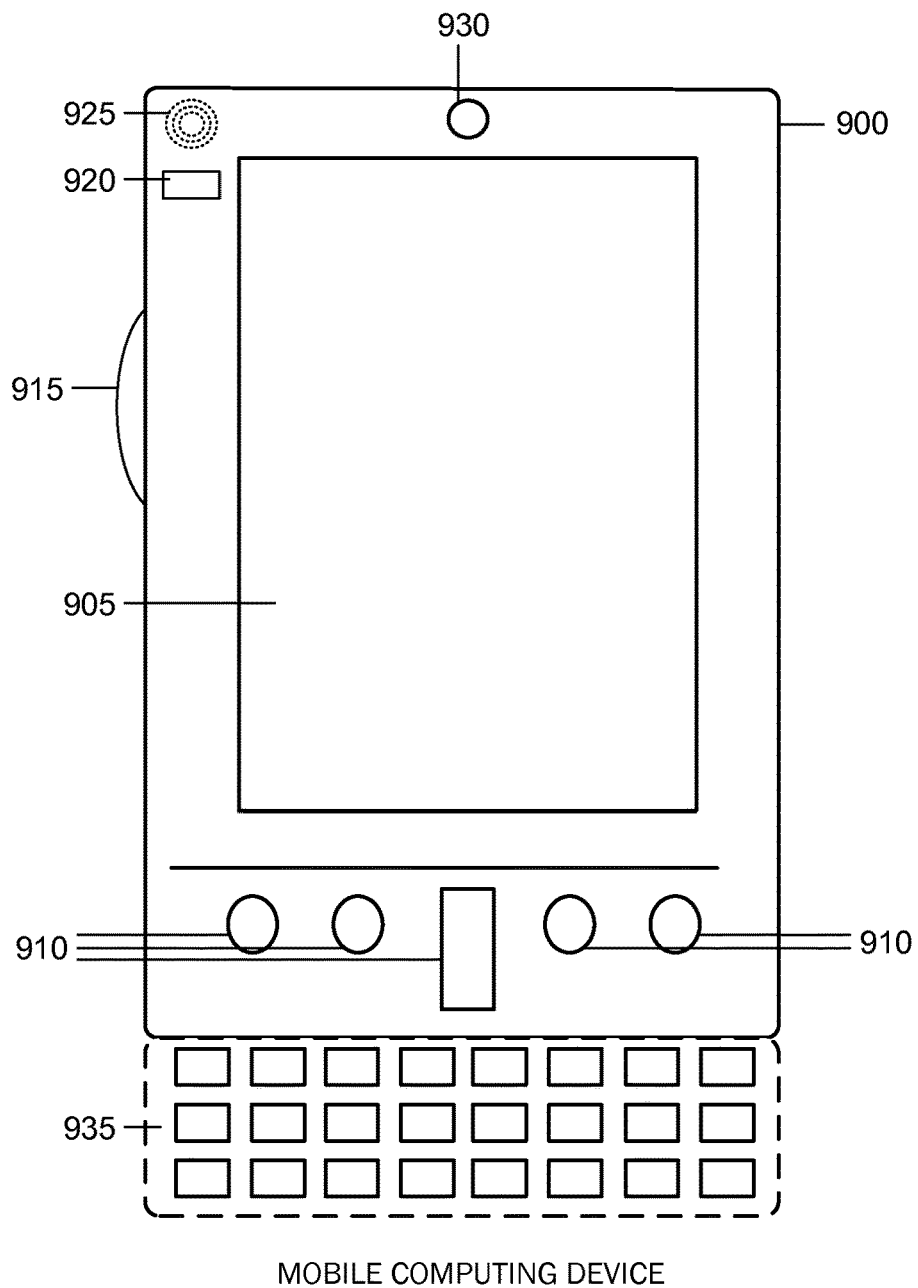
FIGS. 9A and 9B are simplified block diagrams of a mobile computing device with which embodiments of the present invention may be practiced.
Figure 9B:
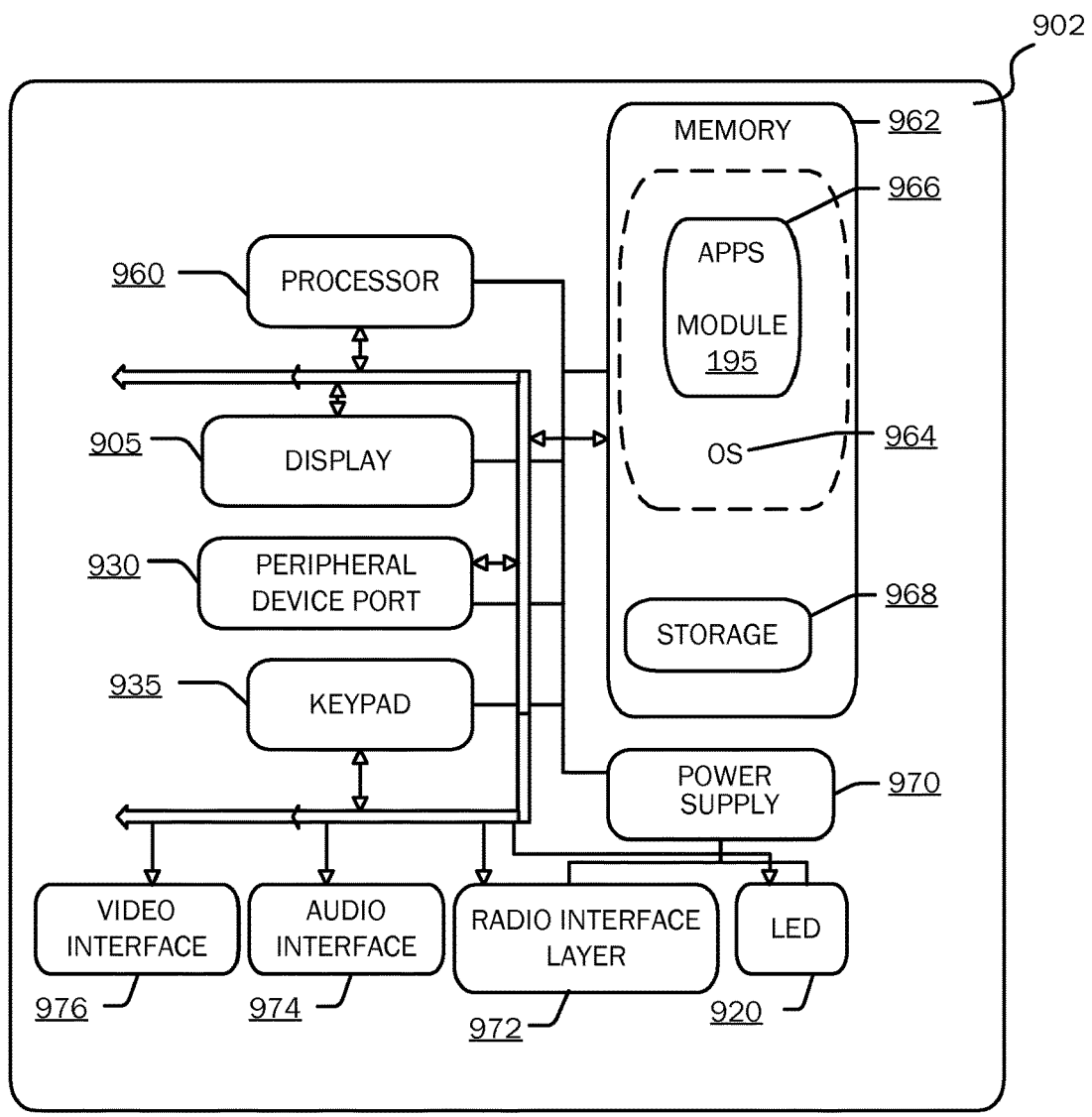
Figure 10:
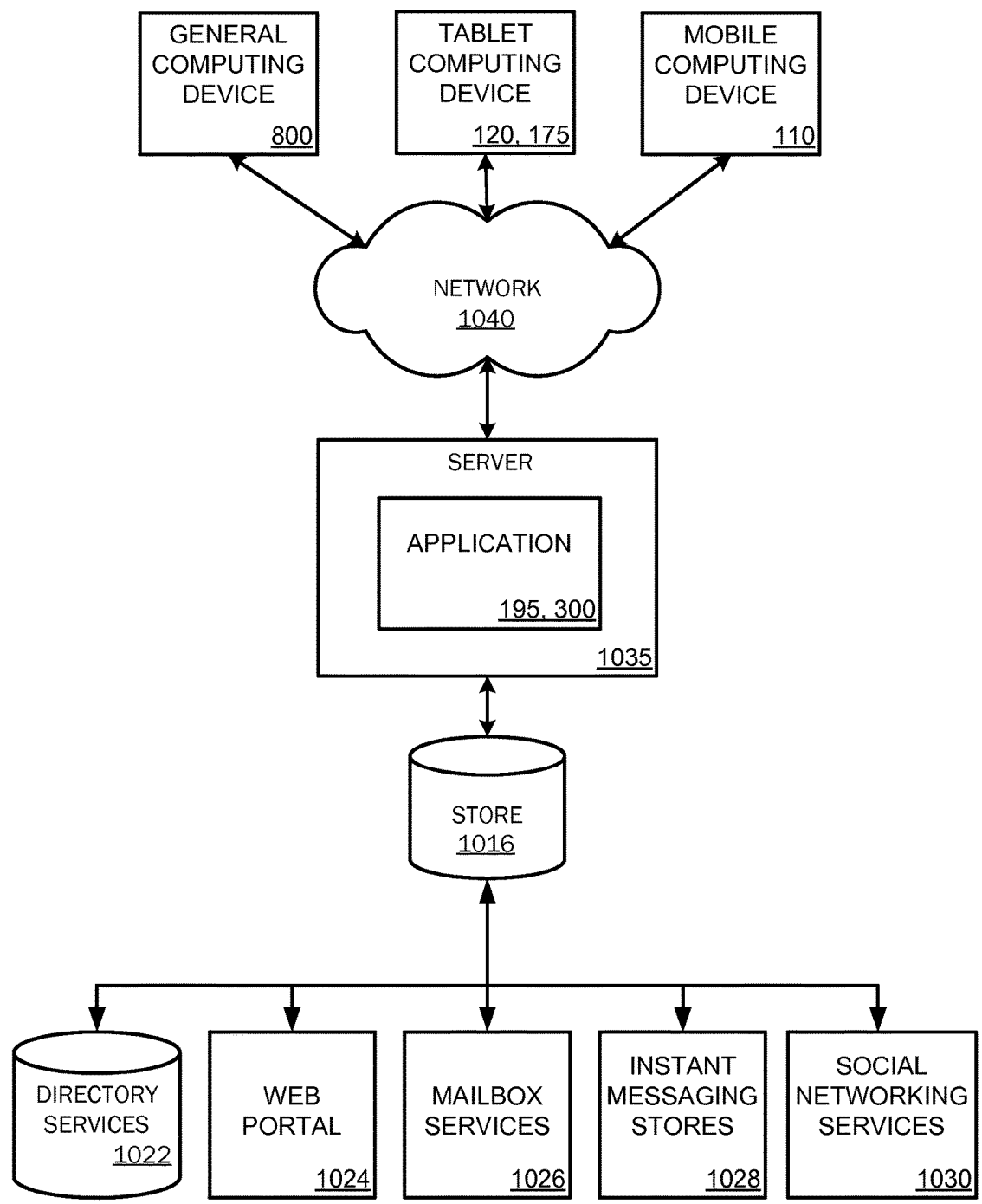
FIG. 10 is a simplified block diagram of a distributed computing system in which embodiments of the present invention may be practiced.

FIGS. 8-10 and the associated descriptions provide a discussion of a variety of operating environments in which embodiments of the invention may be practiced. However, the devices and systems illustrated and discussed with respect to FIGS. 8-10 are for purposes of example and illustration and are not limiting of a vast number of computing device configurations that may be utilized for practicing embodiments of the invention, described herein.

FIG. 8 is a block diagram illustrating physical components (i.e., hardware) of a computing device 800 with which embodiments of the invention may be practiced. The computing device components described below may be suitable for the computing devices 110, 120, 175 described above. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for running software applications 820 such as the screenshot isolation module 195. The operating system 805, for example, may be suitable for controlling the operation of the computing device 800. Furthermore, embodiments of the invention may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., the screenshot isolation module 195) may perform processes including, but not limited to, one or more of the stages of the method 700 illustrated in FIG. 7. Other program modules that may be used in accordance with embodiments of the present invention may include applications 300, such as, notes applications, electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the screenshot isolation module 195 may be operated via application-specific logic integrated with other components of the computing device 800 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 800 may also have one or more input device(s) 812 such as a keyboard, a mouse, a pen, a sound input device, a touch input device, etc. The output device(s) 814 such as a display, speakers, a printer, etc. may also be included. The aforementioned devices are examples and others may be used. The computing device 800 may include one or more communication connections 816 allowing communications with other computing devices 818. Examples of suitable communication connections 816 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800.

FIGS. 9A and 9B illustrate a mobile computing device 900, for example, a mobile telephone, a smart phone 110 a tablet-style personal computer 120, 175, a laptop computer, and the like, with which embodiments of the invention may be practiced. With reference to FIG. 9A, one embodiment of a mobile computing device 900 for implementing the embodiments is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative embodiments, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some embodiments, the mobile computing device 900 incorporates a vibration transducer for providing the user with tactile feedback. In yet another embodiment, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one embodiment of a mobile computing device. That is, the mobile computing device 900 can incorporate a system (i.e., an architecture) 902 to implement some embodiments. In one embodiment, the system 902 is implemented as a "smart phone" capable of running one or more applications (e.g., browser, e-mail, calendaring, contact managers, messaging clients, games, and media clients/players). In some embodiments, the system 902 is integrated as a computing device, such as an integrated personal digital assistant (PDA) and wireless phone.

One or more application programs may be loaded into the memory 962 and run on or in association with the operating system 964. Examples of the application programs include phone dialer applications, e-mail applications, personal information management (PIM) applications, word processing applications, spreadsheet applications, Internet browser applications, notes applications, messaging applications, and so forth. The system 902 also includes a non-volatile storage area 968 within the memory 962. The non-volatile storage area 968 may be used to store persistent information that should not be lost if the system 902 is powered down. The application programs may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900, including the screenshot isolation module 195 described herein.

The system 902 has a power supply 970, which may be implemented as one or more batteries. The power supply 970 might further include an external power source, such as an AC adapter or a powered docking cradle that supplements or recharges the batteries.

The system 902 may also include a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 966 via the operating system 964, and vice versa.

The visual indicator 920 may be used to provide visual notifications and/or an audio interface 974 may be used for producing audible notifications via the audio transducer 925. In the illustrated embodiment, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present invention, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio 972 or via a distributed computing network. Similarly, such data/information may be readily transferred between computing devices for storage and use according to well-known data/information transfer and storage means, including electronic mail and collaborative data/information sharing systems.

FIG. 10 illustrates one embodiment of the architecture of a system for providing screenshot isolation, as described above. Content developed, interacted with, or edited in association with the screenshot isolation module 195 may be stored in different communication channels or other storage types. For example, various documents and stored content items (including screenshots) may be stored using a directory service 1022, a web portal 1024, a mailbox service 1026, an instant messaging store 1028, or a social networking site 1030. The screenshot isolation module 195 may use any of these types of systems or the like for enabling data utilization, as described herein. A server 1035 may provide output of the screenshot isolation module 195 to clients. As one example, the server 1035 may be a web server providing the functionality of the screenshot isolation module 195 over the web. The server 1035 may provide the functionality of the screenshot isolation module 195 over the web to clients through a network 1040. By way of example, the client computing device may be implemented and embodied in a personal computer 800, a tablet computing device 120, 175 and/or a mobile computing device 110 (e.g., a smart phone), or other computing device. Any of these embodiments of the client computing device 800, 110, 120,175 may obtain content from the store 1016.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

I claim:

1. A computer-implemented method of isolating a captured screenshot from other electronic content items, comprising:
receiving a selection to identify screenshots;
accessing a gallery of electronic content items stored in a single content repository, wherein the electronic content items include photos, screenshots and other content items;
determining, for each electronic content item, whether the electronic content item is stored in the single content repository in association with screen resolution information specifying a screen resolution at which the content item was captured;
identifying a screen resolution of a computing device utilized for capturing at least one of the screenshots;
for those ones of the electronic content items determined to be stored in the single content repository in association with screen resolution information, comparing the screen resolution specified by the screen resolution information to the identified screen resolution of the computing device utilized for capturing at least one of the screenshots, to determine whether the electronic content item associated with the screen resolution information is a screenshot;
isolating the screenshots from the photos and the other content items within the electronic content items; and
displaying the isolated screenshots.

2. The method of claim 1, wherein the comparing includes comparing a screen resolution associated with any of the one or more electronic content items with one or more known computing device screen resolutions for determining whether any of the one or more electronic content items were captured as screenshots.

3. The method of claim 2, wherein prior to the comparing, receiving one or more screen resolutions of one or more computing devices that are operative to capture screenshots.

4. The method of claim 2, further comprising segregating any of the electronic content items identified as screenshots into groupings of screenshots such that each grouping contains screenshots associated with a same screen resolution.

5. The method of claim 1, further comprising receiving a selection of a command for displaying one or more stored screenshots.

6. The method of claim 1, further comprising displaying any of the one or more electronic content items identified as screenshots in a gallery of screenshots.

7. The method of claim 6, further comprising receiving a selection of a displayed screenshot from the gallery of screenshots; and inserting the selected screenshot into an electronic document.

8. The method of claim 6, further comprising receiving a selection of a displayed screenshot from the gallery of screenshots; and displaying the selected screenshot for review.

9. The method of claim 1, further comprising displaying any of the one or more electronic content items not identified as screenshots in a gallery of electronic content items not including screenshots.

10. The method of claim 1, further comprising, for those ones of the electronic content items determined not to be stored in association with screen resolution information, not displaying those electronic content items.

11. A computer implemented method of isolating captured screenshots from other electronic content items; comprising:
displaying a gallery of electronic content items stored in a single content repository, wherein the electronic content items include photos, screenshots and other content items;
receiving a resolution associated with any of the electronic content items displayed in the gallery of electronic content items;
receiving a selection for displaying only electronic content items identified as screenshots;
determining, for each electronic content item, whether the electronic content item is stored in the single content repository in association with screen resolution information specifying a screen resolution at which the content item was captured;

for those ones of the electronic content items determined to be stored in the single content repository in association with screen resolution information, determining whether any of those ones of the electronic content items are screenshots by determining whether the resolution specified by the screen resolution information matches a known screen resolution of one or more computing devices that are operative to capture screenshots and, when the resolution specified by the screen resolution information matches the known screen resolution of one or more computing devices that are operative to capture screenshots, identifying any of those ones of the electronic content items as screenshots;

isolating the screenshots from the photos and other content items within the electronic content items; and displaying any of the electronic content items contained in the gallery of electronic content items that are screenshots in a gallery of screenshots.

12. The method of claim 11, wherein determining whether the screen resolution matches a known screen resolution of one or more computing devices that are operative to capture screenshots includes comparing a screen resolution associated with any of the one or more received electronic content items with one or more known computing device screen resolutions for determining whether any of the one or more received electronic content items were captured as screenshots.

13. The method of claim 12, wherein prior to determining whether the screen resolution matches a known screen resolution of one or more computing devices that are operative to capture screenshots, receiving one or more screen resolutions of one or more computing devices that are operative to capture screenshots.

14. The method of claim 11, wherein receiving a selection for displaying only electronic content items identified as screenshots includes receiving a selection for inserting a screenshot into an electronic document.

15. The method of claim 14, further comprising receiving a selection of a displayed screenshot from the gallery of screenshots; and inserting the selected screenshot into an electronic document.

16. The method of claim 11, further comprising segregating any of the electronic content items identified as screenshots into groupings of screenshots such that each grouping contains screenshots associated with a same screen resolution.

17. A computer implemented method of isolating a captured screenshot from other electronic content items, comprising:

displaying a document within a content creation application;

receiving a selection to insert a screenshot into the document;

accessing electronic content items including photos, screenshots and other content items that are stored within a single content repository;

determining, for each electronic content item, whether the electronic content item is stored in the single content repository in association with screen resolution information specifying a screen resolution at which the content item was captured;

for those ones of the electronic content items determined to be stored in the single content repository in association with screen resolution information, determining which ones of those ones of the electronic content items are screenshots;

isolating the screenshots from the photos and the other content items within the electronic content items;

displaying one or more of the isolated screenshots;

receiving a selection of a screenshot of the isolated screenshots; and inserting the selected screenshot within the document, wherein determining which ones of those ones of the electronic content items are screenshots further comprises comparing the screen resolution specified by the screen resolution information against screen resolutions of devices operative to capture screenshots.

18. The computer implemented method of claim 17, further comprising displaying a gallery of electronic content items including photos, screenshots and other content items.

19. The computer implemented method of claim 17, wherein displaying one or more of the isolated screenshots further comprises displaying a gallery of thumbnails that represent the isolated screenshots.

20. The computer implemented method of claim 17, wherein the screen resolution of a computing device utilized for capturing at least one of the screenshots is stored with the electronic content items.

* * * * *